(12) United States Patent
Herriman et al.

(10) Patent No.: US 7,965,825 B1
(45) Date of Patent: Jun. 21, 2011

(54) METHODS AND SYSTEMS FOR TRANSFERRING VOICE MESSAGES AND FAXES OVER A NETWORK

(75) Inventors: Scott Herriman, Santa Barbara, CA (US); Ivan Johannessen, Santa Barbara, CA (US); Leland W. Kirchhoff, Santa Barbara, CA (US); David Trandal, Santa Barbara, CA (US); Donnie Tognazzini, Santa Barbara, CA (US); Russell Williams, Santa Barbara, CA (US); Colin Kelley, Santa Barbara, CA (US)

(73) Assignee: Callwave, Inc., Santa Barbara, CA (US)

( * ) Notice: Subject to any disclaimer, the term of this patent is extended or adjusted under 35 U.S.C. 154(b) by 1328 days.

(21) Appl. No.: 11/497,403

(22) Filed: Aug. 1, 2006

Related U.S. Application Data

(63) Continuation of application No. 11/120,163, filed on May 2, 2005, now abandoned.

(51) Int. Cl.
*H04M 11/00* (2006.01)
(52) U.S. Cl. .................. 379/100.08; 379/88.11
(58) Field of Classification Search ........... 379/100.08, 379/88.11, 93.24, 93.08
See application file for complete search history.

(56) References Cited

U.S. PATENT DOCUMENTS

| | | | |
|---|---|---|---|
| 3,936,613 A | 2/1976 | Nishigori et al. |
| 3,956,595 A | 5/1976 | Sobanski |
| 4,009,337 A | 2/1977 | Sakai et al. |
| 4,022,983 A | 5/1977 | Braun et al. |
| 4,485,470 A | 11/1984 | Reali |
| 4,736,405 A | 4/1988 | Akiyama |
| 4,809,321 A | 2/1989 | Morganstein et al. |
| 4,893,336 A | 1/1990 | Wuthnow |
| 4,994,926 A | 2/1991 | Gordon et al. |
| 5,040,208 A | 8/1991 | Jolissaint |
| 5,046,087 A | 9/1991 | Sakai |
| 5,291,302 A | 3/1994 | Gordon et al. |

(Continued)

FOREIGN PATENT DOCUMENTS

CA    1329852    9/1989

(Continued)

OTHER PUBLICATIONS

Johnson, Dave; Article; "Now You're Talking—voice—response systems for home offices—Product Information"; http://www.findarticles.com; Feb. 1999.

(Continued)

*Primary Examiner* — Stella L Woo
(74) *Attorney, Agent, or Firm* — Knobbe, Maretns, Olson & Bear LLP

(57) ABSTRACT

Processes and systems for transferring communication messages, such as fax and voice messages, between a computer and a terminal are disclosed. For example, a fax message intended for a user is received at a call processing system. A voice message intended for the user is received at the call processing system. An initial portion of the fax message and the voice message are transferred to a user terminal. The user can view the initial portion of the fax message and listed in the initial portion of the voice message using the user terminal. At least a second portion of the fax message is downloaded to the user terminal in a trickle mode, and at least a second portion of the voice message is downloaded to the user terminal in a trickle mode.

21 Claims, 5 Drawing Sheets

U.S. PATENT DOCUMENTS

| | | |
|---|---|---|
| 5,323,450 A | 6/1994 | Goldhagen |
| 5,404,537 A | 4/1995 | Olnowich et al. |
| 5,434,908 A | 7/1995 | Klein |
| 5,459,584 A | 10/1995 | Gordon et al. |
| 5,467,388 A | 11/1995 | Redd, Jr. et al. |
| 5,526,524 A | 6/1996 | Madduri |
| 5,533,102 A | 7/1996 | Robinson et al. |
| 5,533,106 A | 7/1996 | Blumhardt |
| 5,577,111 A | 11/1996 | Iida et al. |
| 5,583,918 A | 12/1996 | Nakagawa |
| 5,619,557 A | 4/1997 | Van Berkum |
| 5,640,677 A | 6/1997 | Karlsson |
| 5,651,054 A | 7/1997 | Dunn et al. |
| 5,668,861 A | 9/1997 | Watts |
| 5,751,795 A | 5/1998 | Hassler et al. |
| 5,761,312 A | 6/1998 | Zelikovitz et al. |
| 5,774,067 A | 6/1998 | Olnowich et al. |
| 5,805,587 A | 9/1998 | Norris et al. |
| 5,809,128 A | 9/1998 | McMullin |
| 5,812,551 A | 9/1998 | Tsukazoe et al. |
| 5,825,867 A | 10/1998 | Epler et al. |
| 5,832,060 A | 11/1998 | Corlett et al. |
| 5,835,573 A | 11/1998 | Dee et al. |
| 5,894,504 A | 4/1999 | Alfred et al. |
| 5,946,386 A | 8/1999 | Rogers et al. |
| 5,960,064 A | 9/1999 | Foladare et al. |
| 5,960,073 A | 9/1999 | Kikinis et al. |
| 5,963,629 A | 10/1999 | Jung |
| 5,995,594 A | 11/1999 | Shaffer et al. |
| 5,995,603 A | 11/1999 | Anderson |
| 6,014,436 A | 1/2000 | Florence et al. |
| 6,032,051 A | 2/2000 | Hall et al. |
| 6,034,956 A | 3/2000 | Olnowich et al. |
| 6,035,031 A | 3/2000 | Silverman |
| 6,044,059 A | 3/2000 | Olnowich |
| 6,078,581 A | 6/2000 | Shtivelman et al. |
| 6,104,800 A | 8/2000 | Benson |
| 6,144,644 A | 11/2000 | Bajzath et al. |
| 6,160,881 A | 12/2000 | Beyda et al. |
| 6,167,127 A | 12/2000 | Smith et al. |
| 6,169,795 B1 | 1/2001 | Dunn et al. |
| 6,169,796 B1 | 1/2001 | Bauer et al. |
| 6,175,622 B1 | 1/2001 | Chiniwala et al. |
| 6,178,183 B1 | 1/2001 | Buskirk, Jr. |
| 6,181,691 B1 | 1/2001 | Markgraf et al. |
| 6,208,638 B1 | 3/2001 | Rieley et al. |
| 6,212,261 B1 | 4/2001 | Meubus et al. |
| 6,230,009 B1 | 5/2001 | Holmes et al. |
| 6,243,378 B1 | 6/2001 | Olnowich |
| 6,253,249 B1 | 6/2001 | Belzile |
| 6,266,159 B1 | 7/2001 | Otsuka et al. |
| 6,278,704 B1 | 8/2001 | Creamer et al. |
| 6,304,565 B1 | 10/2001 | Ramamurthy |
| 6,310,939 B1 | 10/2001 | Varney |
| 6,350,066 B1 | 2/2002 | Bobo, II |
| 6,353,660 B1 | 3/2002 | Burger et al. |
| 6,353,663 B1 | 3/2002 | Stevens et al. |
| 6,363,414 B1 | 3/2002 | Nicholls et al. |
| 6,405,035 B1 | 6/2002 | Singh |
| 6,411,601 B1 | 6/2002 | Shaffer et al. |
| 6,411,805 B1 | 6/2002 | Becker et al. |
| 6,438,216 B1 | 8/2002 | Aktas |
| 6,438,222 B1 | 8/2002 | Burg |
| 6,477,246 B1 | 11/2002 | Dolan et al. |
| 6,483,600 B1 | 11/2002 | Schuster et al. |
| 6,496,569 B2 | 12/2002 | Pelletier et al. |
| 6,496,576 B2 | 12/2002 | Tanaka et al. |
| 6,501,750 B1 | 12/2002 | Shaffer et al. |
| 6,505,163 B1 | 1/2003 | Zhang et al. |
| 6,510,162 B1 | 1/2003 | Fijolek et al. |
| 6,510,417 B1 | 1/2003 | Woods et al. |
| 6,512,930 B2 | 1/2003 | Sandegren |
| 6,519,258 B1 | 2/2003 | Tsukazoe et al. |
| 6,539,084 B1 | 3/2003 | Long |
| 6,546,087 B2 | 4/2003 | Shaffer et al. |
| 6,549,612 B2 | 4/2003 | Gifford et al. |
| 6,553,222 B1 | 4/2003 | Weiss |
| 6,564,264 B1 | 5/2003 | Creswell et al. |
| 6,564,321 B2 | 5/2003 | Bobo, II |
| 6,567,505 B1 | 5/2003 | Omori et al. |
| 6,574,319 B2 | 6/2003 | Latter et al. |
| 6,594,351 B1 | 7/2003 | Bhogal et al. |
| 6,621,892 B1 | 9/2003 | Banister et al. |
| 6,643,034 B1 | 11/2003 | Gordon et al. |
| 6,658,100 B1 | 12/2003 | Lund |
| 6,661,785 B1 | 12/2003 | Zhang et al. |
| 6,662,232 B1 | 12/2003 | Nicholls et al. |
| 6,690,785 B1 | 2/2004 | Stelter et al. |
| 6,721,408 B1 | 4/2004 | Bain et al. |
| 6,751,299 B1 | 6/2004 | Brown et al. |
| 6,775,370 B2 | 8/2004 | Burg |
| 6,782,088 B1 | 8/2004 | Gabara |
| 6,785,021 B1 | 8/2004 | Gordon et al. |
| 6,792,094 B1 | 9/2004 | Kirkpatrick |
| 6,798,870 B1 | 9/2004 | Lines et al. |
| 6,801,932 B1 | 10/2004 | Picoult et al. |
| 6,857,074 B2 | 2/2005 | Bobo, II |
| 6,898,275 B2 | 5/2005 | Dolan et al. |
| 6,928,479 B1 | 8/2005 | Meyer et al. |
| 6,968,174 B1 | 11/2005 | Trandal et al. |
| 7,003,087 B2 | 2/2006 | Spencer et al. |
| 7,003,554 B1 | 2/2006 | Turner et al. |
| 7,106,843 B1 | 9/2006 | Gainsboro et al. |
| 7,230,745 B1 | 6/2007 | Street, Jr. |
| 7,272,633 B2 * | 9/2007 | Malik et al. .................. 709/206 |
| 7,283,270 B2 | 10/2007 | Boire-Lavigne et al. |
| 7,363,384 B2 | 4/2008 | Chatani et al. |
| 2001/0004741 A1 | 6/2001 | Sogo |
| 2002/0002704 A1 | 1/2002 | Davis |
| 2002/0010616 A1 | 1/2002 | Itzhaki |
| 2002/0041391 A1 | 4/2002 | Bannai |
| 2002/0097710 A1 | 7/2002 | Burg |
| 2003/0039339 A1 | 2/2003 | Luehrig et al. |
| 2003/0048484 A1 | 3/2003 | Seki et al. |
| 2003/0063731 A1 | 4/2003 | Woodring |
| 2003/0066065 A1 | 4/2003 | Larkin |
| 2003/0072432 A1 | 4/2003 | Kelly |
| 2003/0086124 A1 | 5/2003 | Parry |
| 2003/0123629 A1 | 7/2003 | Hussain et al. |
| 2003/0135586 A1 | 7/2003 | Minborg |
| 2003/0156700 A1 | 8/2003 | Brown et al. |
| 2003/0167373 A1 | 9/2003 | Winters et al. |
| 2003/0197889 A1 | 10/2003 | Tanimoto |
| 2003/0215078 A1 | 11/2003 | Brahm et al. |
| 2004/0001221 A1 | 1/2004 | McCallum |
| 2004/0010786 A1 | 1/2004 | Cool et al. |
| 2004/0028203 A1 | 2/2004 | Wurster et al. |
| 2004/0143628 A1 | 7/2004 | Bradford et al. |
| 2004/0146153 A1 | 7/2004 | Solin |
| 2004/0153538 A1 | 8/2004 | Champlin |
| 2004/0184096 A1 | 9/2004 | Choi |
| 2004/0190706 A1 | 9/2004 | Fleischer, III et al. |
| 2004/0205170 A1 | 10/2004 | Minborg |
| 2004/0237078 A1 | 11/2004 | Weiss et al. |
| 2004/0258220 A1 | 12/2004 | Levine et al. |
| 2005/0041643 A1 | 2/2005 | Noguchi et al. |
| 2005/0044280 A1 | 2/2005 | Reisman |
| 2005/0053216 A1 | 3/2005 | Spencer et al. |
| 2005/0123118 A1 | 6/2005 | Terry et al. |
| 2005/0154599 A1 | 7/2005 | Kopra et al. |
| 2005/0166246 A1 | 7/2005 | Calmels et al. |
| 2005/0193070 A1 * | 9/2005 | Brown et al. .................. 709/206 |
| 2005/0207556 A1 | 9/2005 | Gonzalez et al. |
| 2005/0210459 A1 | 9/2005 | Henderson et al. |
| 2005/0265322 A1 | 12/2005 | Hester |
| 2006/0013374 A1 | 1/2006 | Fleischer, III et al. |
| 2006/0080656 A1 | 4/2006 | Cain et al. |
| 2006/0130045 A1 | 6/2006 | Wesley et al. |
| 2006/0268007 A1 | 11/2006 | Gopalakrishnan |
| 2006/0268831 A1 | 11/2006 | Ulybin |
| 2007/0002077 A1 | 1/2007 | Gopalakrishnan |
| 2007/0013960 A9 | 1/2007 | Gordon et al. |
| 2007/0067738 A1 | 3/2007 | Flynt et al. |
| 2007/0116213 A1 | 5/2007 | Gruchala et al. |
| 2007/0202898 A1 | 8/2007 | Bae et al. |

| | | | |
|---|---|---|---|
| 2007/0223053 A1 | 9/2007 | Jin | |
| 2007/0223056 A1 | 9/2007 | Arimoto | |
| 2007/0229910 A1 | 10/2007 | Ulybin | |

FOREIGN PATENT DOCUMENTS

| | | |
|---|---|---|
| CA | 1329852 | 5/1994 |
| EP | 0 509 945 A2 | 3/1992 |
| EP | 1 120 954 | 8/2001 |
| EP | 1120954 | 8/2001 |
| EP | 1 213 647 A1 | 6/2002 |
| EP | 1 282 036 A2 | 2/2003 |
| JP | 10-513632 | 12/1998 |
| JP | 11-506292 | 6/1999 |
| JP | 2001-168989 | 6/2001 |
| WO | WO 96/18948 | 6/1996 |
| WO | WO 97/26749 | 7/1997 |
| WO | WO 00/60840 | 10/2000 |
| WO | WO 01/76210 | 10/2001 |
| WO | WO 03/063533 A2 | 7/2003 |

OTHER PUBLICATIONS

Microsoft® Windows® Server Technical Article; "*Background Intelligent Transfer Service*"; Microsoft Corporation; Published Aug. 2002; pp. 1-18.

Article: Johnson, Dave; "Now You're Talking-voice-response systems for home offices—Product Information"; *HomeOffice Computing*; http://www.findarticles.com; Feb. 1999.

Article: "Widget MySpace Widget"; posted by 4INFO Bob; http://4info.typepad.com/blog/2006/09/widget_myspace_.html; Sep. 15, 2006; 3 pages.

Article: Communications-SMS, Dashboard Widgets—Showcase; http://www.dashboardwidgets.com/showcase/details.php?wid=1082; Oct. 14, 2005; 2 pages.

\* cited by examiner

| MESSAGE NUMBER | MESSAGE TYPE | SENDER | TIME | TOTAL LENGTH (TIME/PAGES) | PARTIAL/ COMPLETE DOWNLOAD | DOWNLOAD NOW | VIEW |
|---|---|---|---|---|---|---|---|
| 1 | VOICE | JOE DOE | 10:15AM 4/1/05 | 30 SECONDS | COMPLETE | ALREADY DOWNLOADED | YES |
| 2 | VOICE | (310) 555-5555 | 12:32PM 4/1/05 | 1 MINUTE | PARTIAL | DOWNLOAD | YES |
| 3 | FAX | ACME | 12:35PM 4/1/05 | 4 PAGES | PARTIAL | DOWNLOAD | YES |
| 3 | VOICE | RESTRICTED | 12:37PM 4/1/05 | 45 SECONDS | PARTIAL | DOWNLOAD | YES |

FIG. 4

METHODS AND SYSTEMS FOR TRANSFERRING VOICE MESSAGES AND FAXES OVER A NETWORK

This application is a continuation of U.S. patent application Ser. No. 11/120,163, filed 2 May 2005, now abandoned the entire disclosure of which is hereby incorporated by reference herein.

BACKGROUND OF THE INVENTION

1. Field of the Invention

The present invention is related to transferring data, and in particular to transferring data between computers over a network.

2. Description of the Related Art

As the use of the Internet has increased, it has become more common for service providers to offer voice and fax services, wherein a service provider may receive via the PSTN (Public Switch Telephone Network) and store on the service provider's computer system voice messages and faxes intended for a service subscriber. The service provider then may email, or offer for download via the Internet, the stored voice messages and faxes.

However, with respect to emailing voice mail and fax files, the voice mail and fax files may be very large (e.g., several megabytes in size), and so may exceed the file size permitted by a subscriber's email provider and will significantly slow the transfer of such email to the subscriber's computer.

With respect to downloading voice mail and fax files, where such files are relatively large, the download process may utilize an undesirable amount of the subscriber's network bandwidth and computer resources. If the subscriber is utilizing a dial-up link (as opposed to a broadband connection), the download delays and the burden placed on the subscriber's computer resources can be especially problematic.

Some conventional service providers attempt to provide the subscriber with a list of messages in a messaging mailbox. If subscriber wants to play or display a message, the requested message is downloaded to the user's computer on demand. Disadvantageously, some such conventional systems download all of the messages via the Internet at the beginning of the subscriber's dial-up session, resulting in a clogged Internet connection, or the subscriber has to wait each time the subscriber requests a message. Another disadvantage is that subscribers of many such conventional services cannot access messages when they are not connected to the Internet.

SUMMARY OF THE INVENTION

As described herein, embodiments of the present invention provide for flexible downloading or transferring of files, such as digital voice mail files and fax files, from one computer system to another computer system.

One embodiment provides a method of storing and downloading voice and fax communications, the method comprising: receiving and storing a fax message intended for a user at a call processing system; receiving and storing a voice message intended for the user at the call processing system; downloading an initial portion of the fax message to a user terminal and enabling the user to view initial portion of the fax message using the user terminal; downloading an initial portion of the voice message to the user terminal and enabling the user to playback the initial portion of the voice message using the user terminal; downloading at least a second portion of the fax message to the user terminal in a trickle mode; and downloading at least a second portion of the voice message to the user terminal in a trickle mode.

Another embodiment provides a method of storing and downloading messages to user terminals, the method comprising: receiving and storing a first plurality of messages, including fax and/or voice messages intended for a first user, at a first telecommunication system; downloading initial portions of the first plurality of messages to the user terminal, wherein the user terminal is configured to present the downloaded initial portions to the user; accessing from computer readable memory a download chunk size; accessing from computer readable memory an indication as to the rate message chunks are to be downloaded; based at least in part on the accessed download chunk size and the accessed rate, downloading at least second portions of the first plurality of messages to the user terminal in a background mode.

Still another embodiment provides a method of storing and downloading messages to user terminals, the method comprising: receiving and storing a first plurality of messages, including fax and/or voice messages intended for a first user, at a first telecommunication system; initiating the download of initial portions of the first plurality of messages to the user terminal; during the download of initial portions of the first plurality of messages to the user terminal, determining that the user has selected one of the first plurality of messages; pausing the download of the non-selected first plurality of messages at least partly in response to determining that the user has selected one of the first plurality of messages; downloading the selected one of the first plurality of messages in a burst mode; and resuming the download of the initial portions of the non-selected first plurality of messages.

One embodiment provides a call system for storing and downloading voice and/or fax messages to user terminals, the system comprising: a first interface configured to receive messages, including fax and/or voice messages intended for a first user; a memory store configured to store received messages; instructions stored in computer readable memory configured to: download initial portions of a first plurality of messages stored in the memory store and corresponding message header information to a user terminal associated with the first user, wherein the user terminal is configured to present the downloaded initial portions and at least a portion of the message header information to the user; access from computer readable memory a download chunk size; access from computer readable memory an indication as to the rate message chunks are to be downloaded; and based at least in part on the accessed download chunk size and the accessed rate, download at least second portions of the first plurality of messages to the user terminal in a background mode.

BRIEF DESCRIPTION OF THE DRAWINGS

Embodiments of the present invention will now be described with reference to the drawings summarized below. These drawings and the associated description are provided to illustrate example embodiments of the invention, and not to limit the scope of the invention.

FIG. 4 illustrates an example user form used to access communications.

DETAILED DESCRIPTION OF PREFERRED EMBODIMENTS

The present is related to transferring data, and in particular to transferring data between computers, over a network.

Throughout the following description, the term "Web site" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networks of interactive televisions or of telephones, and other protocols, may be used as well.

In addition, unless otherwise indicated, the functions described herein may be performed by executable code and instructions stored in computer readable memory and running on one or more general-purpose computers. However, the present invention can also be implemented using special purpose computers, state machines, and/or hardwired electronic circuits. Further, with respect to the example processes described herein, not all the process states need to be reached, nor do the states have to be performed in the illustrated order. Further, certain process states that are illustrated as being serially performed can be performed in parallel.

Similarly, while the following examples may refer to a user's personal computer system, other computer or electronic systems an be used as well, such as, without limitation, an interactive television, a networked-enabled personal digital assistant (PDA), other IP (Internet Protocol) device, a cellular telephone, a networked navigation system, a networked game console, a networked MP3 device, a networked entertainment device, and so on. In addition, while the following examples refer to downloading fax or voice files, processes disclosed herein can be used for transferring or downloading other types of files.

As described herein, embodiments of the present invention provide for flexible downloading or transferring of communication files (e.g., digitized voice messages and/or faxes) from one computer system, such as a server, to another system, such as a personal computer or other user terminal, over a network, such as the Internet.

Figure 1:
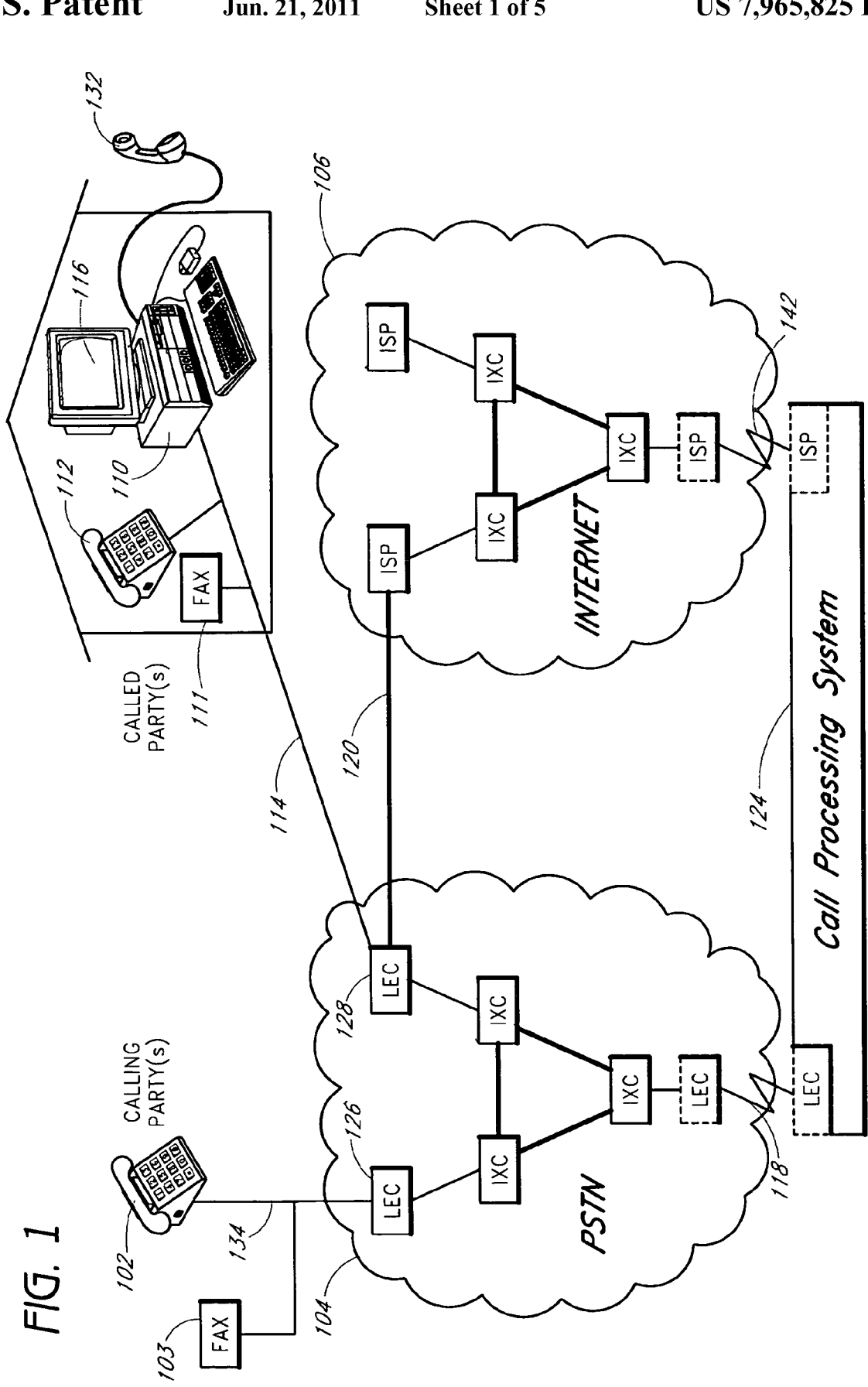
FIG. 1 illustrates an example communication management system connected to a plurality of user terminals.

FIG. 1 illustrates an example telecommunications system that can be used in accordance with the present invention. As illustrated, the telecommunications system includes:

- a plurality of user telephone stations 102, 112.
- a plurality of fax devices (e.g., dedicated fax machines or fax servers) 103, 111.
- a plurality of user computer terminals 110.
- a call processing system 124 which can receive and forward voice messages and faxes, and enable user's to screen and transfer calls.

In this example, these devices are linked together using various line and trunk circuits to a Public Switched Network (PSTN) 104 and to a common data network, such as the Internet 106. Optionally, the call processing system 124 can be linked via a data network, such as a data network provide by Level 3 or other service provider, where inbound calls arrive in a Von) format with SIP signaling.

Figure 2:
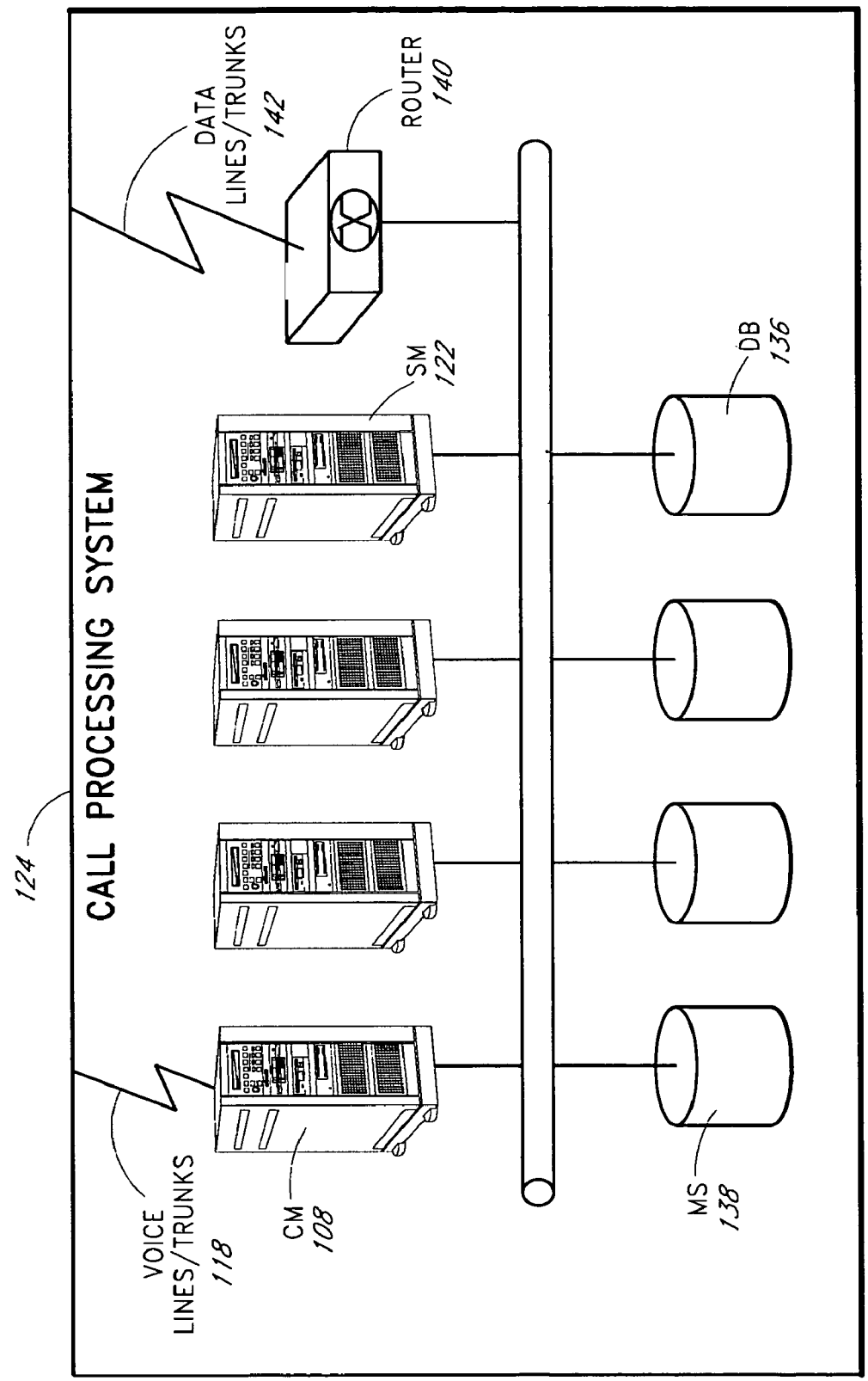
FIG. 2 illustrates the example communication management system in greater detail.

FIG. 2 further decomposes the call processing system 124 into certain functional components:

- a Call Management (CM) subsystem 108, which serves as the interface to the PSTN 104 to manage inbound and outbound telephone and fax calls. The CM subsystem can optionally host a fax server.
- a Router subsystem 140, which is coupled to data lines/trunks 142, serves as the interface to the Internet 106 to manage communications between online IP client devices and the various call processing system servers.
- an online presence detection Internet Session Management (SM) subsystem 122, which monitors the status of subscriber data terminals to determine subscriber terminal availability for call handling services.
- a shared Media Storage (MS) subsystem 138, which persistently archives the caller's voice messages, the called party/subscriber's personal greeting(s), incoming fax communications, and information related to the foregoing.
- a call processing system Database (DB) subsystem 136 in which called party/subscriber call processing system service parameters are stored.

These various subsystems are interconnected via a Local Area Network (LAN) and/or via a Wide Area Network (WAN).

The call processing system service optionally works with the "Call Forward On Busy" feature of a standard or non-standard phone line to answer calls (e.g., while the subscriber is online and is using the phone line to access the Internet). Once activated, callers no longer get annoying busy signals when the subscriber is online, instead, as explained herein, the call processing system will answer the call. The call processing system can also receive calls that are not forwarded, but are instead dialed to a phone number that is consistently answered by the call processing system and optionally associated with the subscriber.

After answering a call, the call processing system 124 plays a greeting to the caller after which the caller can leave a voice message which is recorded by the call processing system 124. The recording can be streamed in substantially real-time, or emailed or download over the Internet or other network to a user computer system or phone as described herein. Optionally, the subscriber can elect to interact with the caller while they are still on the line or can call them back at a later time.

Similarly, if a fax call is directed to a busy subscriber line, the fax call can be forwarded to the call processing system 124. In addition, a fax call intended for a subscriber may be dialed directly to the call processing system 124. The call processing system 124 can store the fax communication and download it to a subscriber terminal, as describer herein.

Referring back to FIG. 1, the user telephone stations 102, 112 and fax devices 103, 111 are respectively connected to local exchange switches 126, 128 via telephone lines 134, 114. The stations 102, 112 can optionally be conventional POTS (Plain Old Telephone Service) telephones or local extensions behind a corporate Private Branch Exchange (PBX), or can be wireless cellular phones connected via a cellular or other wireless network, or can be VoIP devices connected over a data network.

The telephone stations 102, 112 and fax devices 103, 111 can be coupled to the same switch or different switches. If the telephone stations and fax devices 102, 112, 103, 111 are coupled to the same switch, the switch will be local to both the calling and called parties, such as for intra-LATA (Local Access Transport Area) or local calls. If telephone stations and fax devices 102, 112 are coupled to different switches, each switch may be local only to one of the parties, as is the case for non-local calls such as inter-LATA (long-distance) calls. The PSTN 104 can be configured to handle mobile, wireless stations via wireless communications towers configured to broadcast and receive cellular radio frequency communications. The wireless towers can be, for example and without limitation, CDMA or GSM cellular mobile base stations.

In the illustrated embodiment, the CM subsystem 108 is coupled into the PSTN 104 through voice trunk circuits 118 directly interfacing with the Inter Exchange Carrier's (IXC) circuit switched or packet switched telephony network. Thus, the call processing system 124 does not have to be directly serviced by the same Local Exchange Carrier's (LEC) switch or PBX as the calling or called terminals 102 and 112 or fax devices 103, 111. Indeed, the call processing system 124, or its individual subsystem components, can be located in a different country than the called and calling parties. In this instance, the call processing system 124 is optionally configured as, or to appear as, a telephone end office and can interface with the PSTN 104 as a Class 5 switch. In other embodiments, the call processing system 124 is locally attached to a LEC switch with a physical line or local trunk interface circuit. This switch may or may not be serving telephone stations 102, 112 or fax machines 103, 111.

The call processing system voice trunk circuits 118 are not limited to a particular signaling convention. For example, the present invention can be utilized with a Common Channel Signaling system, such as Signaling System 7 (SS7), having separate voice/user data and signaling channels. In addition, the present invention can be used with other signaling methods, such as the following trunk-side signaling interfaces: ISDN-PRI; Advanced Intelligent Network; VoIP/Data Networks; and/or Service Node architectures. Preferably, the selected signaling system provides a suite of call presentation information to the call processing system 124, optionally including one or more of:

ANI—Automatic Number Identification: phone number and privacy indicator of the calling party ("Caller-ID").

DNIS—Dialed Number Identification: phone number of the call processing system's voice trunks 118 that the call was forwarded to.

OCN—Original Called Number Identification: phone number of the original called party (subscriber to the call processing system service).

Call Type—Forwarded call due to a BCF, RNA, or DND/CFA condition. In addition, directly dialed inbound calls can be handled as well. In this instance, the caller will be required to implement a second stage of dialing to enter the subscriber's phone number or the subscriber could be assigned a unique personal number that is directly dialed by their callers.

The telephone lines 134, 114 may be shared with one or more computer terminals. For example, telephone terminal 112 and fax device 111 share the telephone line 114 with a computer terminal 110. While in the illustrated example the computer terminal 110 is a personal computer, the computer terminal 110 can be an interactive television, a networked-enabled personal digital assistant (PDA), other IP (Internet Protocol) device, or the like. Alternatively, the computer terminal 110 can be a personal computer having a monitor, keyboard, a mouse, a disk drive, sound card or similar sound reproduction circuitry such as a codec, streaming media playback software, such as the Media Player program available from Microsoft, speakers, and a modem, such as a standard V.90 56K dial-up modem. The modem can optionally be configured to dial-up a number under control of an application, such as a contact manager application or telecommunications client application phone dialer, stored and executing on the computer terminal 110.

The telephone line 114, can be used to establish a dial-up connection for computer terminals, such as terminal 110 via the computer modem, to an Internet Service Provider (ISP) offering dial-in remote access service connections from the PSTN 104 via trunk interface circuits 120. The computer terminal 110 can also be connected to the Internet 106 via a broadband connection, such as a DSL line, a television cable line, or a T1 line.

In addition, the computer terminal 110 can be equipped with a Voice over Internet Protocol (VoIP) software module and a headset or a handset 132, including a microphone and speaker, allowing voice communications to be conducted over a computer network, such as the Internet 106. VoIP communicates information via packet switching, which opens a connection just long enough to send a small packet of data. Each packet includes a destination address informing the network where to send the packet along with the actual voice data payload. If the receiving station is also a VoIP terminal, then when the receiving terminal receives the packets, VoIP software executing on the receiving terminal reassembles the packets into the original data stream. The data stream is then converted to a voice signal. If the receiving station is a conventional telephone, then a VoIP gateway converts the packets into a voice signal that is then connected to the PSTN 104.

In one embodiment, the VoIP process is performed using the H.323 standardized protocol established by the International Telecommunications Union (ITU). Advantageously, H.323 provides specifications for real-time, interactive videoconferencing, data sharing and audio applications such as IP telephony. Alternatively, the Session Initiation Protocol (SIP), established by the Internet Engineering Task Force (IETF), can be used. SIP is generally more efficient than the H.323 protocol as SIP is specifically intended for IP telephony. Alternatively, proprietary protocols could be deployed where multi-vendor interoperability is not required.

Optionally, residing and executing on the computer terminal 110 is a communications management Client application 116. The Client application 116 is used to provide communication services, as discussed in greater detail herein. The Client application 116 is connected to, and communicates with the call processing system 124 via the Internet 106, other public wide area computer networks, telephone networks, or the like.

The call processing system 124 optionally hosts a Web site used by subscribers of the call processing system service to setup and manage their accounts, to view information about incoming/stored calls and faxes, and to instruct the call processing system 124 on how to route incoming calls (e.g., voice and/or fax calls) to one or more destination stations. These functions can be implemented by the Client application 116 as well.

Referring now to FIG. 2, the CM subsystem 108 manages communications with the Client application 116 and with calls received by the call processing system 124. The CM subsystem 108 can interact with callers and called parties through voice prompts, voice commands, and/or DTMF (dual tone multi frequency) touch-tone entries. The CM subsystem 108 is optionally configured to perform additional functions, such as acting as a telephone answering system that answers calls, playing outgoing greetings and announcements, recording incoming messages, bridging calls, and receiving and storing faxes. In addition, the CM subsystem 108 optionally further provides a call screening process. The CM subsystem 108 can also receive faxes and digitally store the faxes to be later provided to users, as described herein.

The SM subsystem 122 monitors the Internet for online IP devices registered to call processing system subscribers to determine their availability for handling inbound call screening and call handling services. Optionally, when a user or subscriber connects to the Internet using, for example, a dial-up ISP, the Client application 116 executing on the subscriber's computer terminal 110 makes the subscriber's online presence known to the call processing system 124. Presence detection can be performed by the SM subsystem 122 polling or pinging the computer terminal 110 via the telecommunications Client application 116, or by the telecommunications Client application 116 transmitting a "Login/I'm alive" message and subsequent periodic "keep alive" messages to the SM subsystem 122. Just prior to the normal termination of the online Internet session, the Client application 116 sends a "Logout" message to the SM subsystem 122. Abnormal Internet session termination conditions are detected by the SM subsystem 122 timing out the expected Client "Keep alive" message.

If, rather than using a dial-up connection, the user or subscriber is using a broadband, always on-connection, such as via a DSL line or cable modem, the Client application 116 optionally becomes active when the computer 110 is turned on or powered up and stays on until the user manually shuts down the Client application 116, or the computer 110 is turned off or powered down.

By way of example, the call processing system 124 can transmit or cause a Web form to appear on a user's terminal (e.g., via the Client application 116) which allows the user to specify the type of Internet connection the user has (e.g., broadband or dial-up), whether the user wants voice messages automatically downloaded from the call processing system 124 using a trickle mode (e.g., where the voice message will be automatically downloaded in trickle mode unless the user manually indicates that the voice message is to be transmitted in burst mode) or a burst mode, and whether the user wants faxes automatically downloaded from the call processing system 124 using a trickle mode (e.g., where faxes will be downloaded in trickle mode unless the user manually indicates that a fax is to be transmitted in burst mode) or a burst mode. The user can optionally also specify if downloads are to be performed at a specific time of day, at a specified period, and/or after a certain number of voice message or faxes are stored. The user can also provide, via the form, the user's name, phone number(s), email address, physical address, credit card or other payment information, and the like. Optionally, the system can be configured to trickle or burst messages based on service provider settings, and the user cannot specify whether messages are to be trickle or burst downloaded.

The call processing system 124 can store the user's instructions and information in computer readable memory (e.g., call processing system database 136), wherein the instructions can be accessed as needed, such as when the call processing system 124 receives and stores a voice message or a fax, and the call processing system 124 can download the voice message or fax in accordance with the user instructions.

For example, in an optional embodiment, a call processing system, such as call processing system 124, can receive and store voice messages and/or faxes (e.g., via a PSTN, the Internet, or otherwise) intended for a user. For example, a voice caller (e.g., using phone terminal 102) or a fax caller (e.g., fax machine 103) can call a virtual phone number or line associated with the user and hosted by the call processing system. When a call is placed to the virtual number or line, the call is connected to the call processing system. The call may also have been placed to a phone line associated with the called party, and the call may have been forwarded to the call processing system as a result of a call forwarding on busy, a call forwarding on ring-no-answer, or a call-forward-all calls (sometimes called do-not-disturb) condition.

If the caller is a fax machine (e.g., a dedicated fax machine, a fax server, or other fax device), the call processing system, via a fax server (e.g., CM subsystem 108 or a dedicated fax server) or dedicated fax machine, performs the handshaking with the calling fax machine, and receives and stores the fax in digital form in computer readable memory, such as in a database or other data store. The fax can be stored in association with caller information (e.g., the calling fax phone number, and/or the company or individual associated with the fax machine), as well as the time the fax was received, and the number of pages in the fax. The caller information can be accessed from signaling information (e.g., caller ID information) and/or signaling information provided by the fax machine.

Similarly, if the caller is placing a voice call, the call processing system can answer the call, play a greeting, ask the caller to leave a voice message, and store the voice message in computer readable memory. The voice message can be stored in association with a user (e.g., the called party) identifier (e.g., the user's name or a code associated with the user). The voice message can further be stored in association with caller information (e.g., the caller phone number and/or name), the time of the call, and the length of the call.

Thus, messages received on the call processing system are downloaded to the user's personal computer, wireless device, or other selected terminal, where the messages can be stored for long term storage and substantially immediate retrieval. The trickle download process allows downloads to, and storage on the user's terminal to occur without significantly impacting the user's network bandwidth. The trickle download process helps to ensure that call messages are available on the user's computer or wireless device when the user wishes to review the messages. The trickle download can be throttled to have a minimal or acceptable impact on the user's system resources. This is particularly important for dialup subscribers with limited bandwidth.

By way of example, the trickle download process can optionally be initiated when one of the following events occur:

When the Client 116 logs on and the call processing system determines that calls with messages have been received by the call processing system that are not yet stored on the user's terminal.

Synchronization between the Client 116 and Call Processing system 124 completes and calls with messages have been received by the call processing system that are not yet stored on the user's terminal.

Certain embodiments optionally provide for an initial partial download over a network (e.g., the Internet or a PSTN) to a user terminal of voice message files, fax files and/or identification and header information related to the source of the voice messages or the faxes. Because only portions of files are being downloaded, the download of these portions of faxes and/or voice messages can be performed at a relatively high data rate, optionally utilizing as much of the user network bandwidth as is available, without impacting the network bandwidth or user terminal resources for an unacceptable length of time. Optionally, the remaining non-downloaded portions of the voice messages and/or faxes can then be downloaded to the user terminal in a trickle, background mode, so as not to unduly utilize with the user's network bandwidth and user terminal resources. Indeed, the trickle download can optionally be performed at low enough data rates that the receiving user is unaware that the download is taking place. Optionally, in order to insulate the user from the trickle download process, the user is not presented with a download progress meter when the download process is being performed and/or when the downloaded application file is being installed. Optionally, instead, a download meter can be presented on the user terminal.

In an optional embodiment, after the initial partial message (e.g., a voice message or fax) download, and before or during the trickle download, a user can view, via a client application (e.g., a browser or dedicated application) executing on a user terminal, the identification information (e.g., in a list or table). For faxes, the user can then instruct the client application to display the downloaded portion of a selected fax (e.g., by clicking on a corresponding identifier or icon in the list or table) downloaded portions of a given fax (e.g., the first page of a fax transmittal or a portion of the first fax transmittal) which will then be presented to the user. Similarly, with respect to voice messages, the user can then instruct the client application to play (e.g., via the user terminal speakers) the downloaded portion of a selected voice message (e.g., by clicking on a corresponding identifier or icon in the list or table) and the downloaded portion will be played to the user. If the user clicks on or otherwise selects a given fax or voice message for immediate full download, the selected fax or voice message will then be downloaded by the call processing system at a high data rate, optionally utilizing as much of the user network bandwidth as is available. The full download may optionally download the portion that has not yet been downloaded or may optionally download the entire message, including the portion that had previously been downloaded.

If the trickle download of a given voice message or fax is complete prior to the user selecting such voice message or fax, then if a user selects that voice message or fax, the user can be presented with the complete voice message or fax substantially immediately with no further download of that message required.

By way of example and not limitation, the client application can be a software program, such as a client application used to provide telecommunications services. By way of illustration, the client application (e.g., Client application 116) can be used to notify a user of previously recorded messages, can allow a user to screen and listen in substantially real time as a caller is leaving a message on a call processing system, and can enable the user to instruct the call processing system to direct an incoming call to a specified or selected terminal. Other example applications that can provide an interface for managing faxes and voice messages can include a browser, a wireless phone operating system, a personal computer operating system, and so on.

As discussed above, the download process can be performed in a variety of ways, such as in a burst mode or a trickle mode, or a combination of a burst mode and a trickle mode. By way of example, a trickle download process can include downloading from a remote computer system, such as the call processing system 124, to a local or client computer system files (e.g., fax files or voice message files) in relatively small chunks. Some or all of the chunks are optionally transmitted by the remote computer to the client computer system spaced in part in time at a minimum predetermined time interval. This moderates the usage of the client computer system resources, allowing the client system to run foreground processes without undue interference by the trickle download process.

Optionally, in order to tune the trickle download, the chunk size (which is optionally specified in bytes requested at a time, although other units can be used) and sleep time (seconds or other time units to sleep between chunk requests) are configurable on the call processing system on a global basis (e.g., for all users, or for all users within a group of users) or on a per user basis. Optionally, default values can be set for the chunk size and/or the sleep time.

By way of further example, the burst download process optionally will not attempt to moderate or to significantly moderate the utilization of the client computer system resources during the application or update download, and will instead download the files (e.g., fax files or voice message files) as quickly as the available resources will allow.

A comparison of download times using a burst download and a trickle download will now be provided to illustrate the difference in time of the processes.

For the burst download:
assuming the user computer has 56K dial-up modem providing 33 Kbps real throughput, and that the message file is 700 Kbytes in size, then the download time can be calculated as follows:

$$700K/[(33K\ bits/second)/(8\ bits/byte)]=700K/(4.125K/second)=2.82\ minutes$$

With respect to the trickle download, assuming:
chunk size=2 Kbytes
sleep time=5 seconds sleep between chunk requests
assuming the user computer has 56K modem providing 33 Kbps real throughput, and that the message to be downloaded is 700 Kbytes in size, then the download time can be calculated as follows:
a 2 Kbytes chunk will typically take a bandwidth burst of about half (0.5) a second; (alternating 0.5 seconds of network usage with 5 seconds of sleep should not degrade the user's network performance so as to be easily perceptible by the user.)

$$[2K/(33K\ bits/second)]*(8\ bits/byte)=2K/(33K/second)\sim=0.48\ seconds.$$

Assuming that the message to be downloaded is 700 Kbytes in size, the download time can be calculated as follows:

$$700K*(5\ s+0.5\ s)/2K=350*5.5\ s=1925\ s=32.083\ minutes$$

Thus, in this example, the trickle download time is more than ten times as long as the burst download time. Of course this ratio will change based on the trickle chunk size, sleep time, etc.

With respect to trickle mode downloads, due to the length of time that a trickle download may take, the download client optionally allows the download to occur across as many sessions as needed to download the messages.

Failures during the trickle download are optionally logged to an event log which can be accessed by the user and/or the call processing system. In order to insulate the user from the failure, the user is optionally not informed of the failure. If the download client loses connectivity to a first server from which the download is occurring, the download client automatically attempts to retry the connection. If a connection cannot be established to a first server after a predetermined number of attempts, the download client optionally attempts to retrieve the messages from a backup server.

Thus, trickle download of all calls may optionally be stopped or paused if one or more of the following events occur:

The user requests to view or play another call message

The Client 116 is no longer logged into the session manager 122

An unrecoverable download error occurs

All calls that have been requested to be trickle downloaded complete.

A trickle download process may be interrupted for a variety of reasons. When the trickle download resumes for a call that is partially downloaded, the download process will begin again at the place that the trickle download process left off. For example, in one embodiment, the trickle download of calls with associated media will restart when one of the following is true:

A higher priority user request completes (e.g., a request for an immediate download of a selected call).

The Client logs on.

A call is requested (via synchronization or similar method) to be trickle downloaded.

Optionally, errors that occur during the trickle download process are not reported to the user as the user is unaware that this process is occurring.

Several example fax and voice mail transfer processes will now be discussed. The call processing system can receive and store faxes and/or voice messages for a user. Optionally, if a designated user terminal is available, the call processing system may begin the transfer of a fax or voice message to the user terminal while the fax or voice message is in the process of being received. Optionally, instead, if a designated user terminal is available, the call processing system may begin the transfer of a fax or voice message to the user terminal after the fax or voice message has been fully received and stored by the call processing system.

Optionally, instead, the call processing can receive and store several faxes and/or voice messages for a user before initiating the transfer of those faxes or voice messages to the user terminal. For example, the call processing system may not begin the transfer because the client terminal is not available, because the user specified that downloads are only to be performed at certain times of the day, because the call processing system waits until a certain number or size of files are stored before transfer them, or for other reasons.

As previously discussed, voice and fax message headers (e.g., information about the message excluding the message itself, such as time/date the message was left, caller ID and name associated with the caller, a privacy indication, an urgency indication, the length of the message), optionally in association with a portion of corresponding voice messages and faxes, can first be downloaded using a burst mode.

If more than one voice message and/or fax is stored by the call processing system and are to be downloaded, the call processing system can download the files in a last-in-first out manner (wherein the last received communication is downloaded first) or in a first-in-first-out manner (wherein the first received communication is downloaded first) in accordance with the call processing system set-up (e.g., by the user and/or by a system administrator).

Optionally, the download of the voice and fax message headers/notifications (and optionally the corresponding portions of voice messages and faxes), and/or the download of the entire voice messages and faxes, can be performed sequentially or in a round robin fashion. For example, with respect to a round robin download process, if three messages (e.g., voice messages or faxes) have been received and are ready for download to a user terminal, the header information and a first partial file download of a first message can be performed, then the header information and a first partial file download of a second message can be performed, then the header information and a first partial file download of a third message can be performed, and then, returning back to the first message, a second partial file download of the first message can be performed, then a second partial file download of the second message can be performed, and then a second partial file download of the second message can be performed. The processes can be repeated in round robin fashion until the download of the entire first, second, and third messages are complete.

With respect to sequential message downloads, if for example, three messages (e.g., voice messages or faxes) have been received and are ready for download to a user terminal, the header information to be downloaded and the complete file download of a first message can be performed, then the header information and a complete download of a second message can be performed, and then the header information and a complete file download of a third message can be performed. If the download process is setup to only download a predetermined portion (e.g., the first thirty seconds of a voice mail, or the first page of a fax) and header, unless the user instructs that the complete message be downloaded, then when the sequential message download, a given message predetermined portion and corresponding header information will be completely downloaded before the corresponding download of the next message is begun.

After an initial partial message download a user can view (e.g., in a list or table), via a client application (e.g., a browser or dedicated application) executing on a user terminal, message identification information (e.g., caller ID information). By selecting a message (e.g., by activating a download now link associated with a desired message), the user can instruct the call processing system to stop the background trickle download of other messages, and cause a burst download of the requested message.

Figure 3:
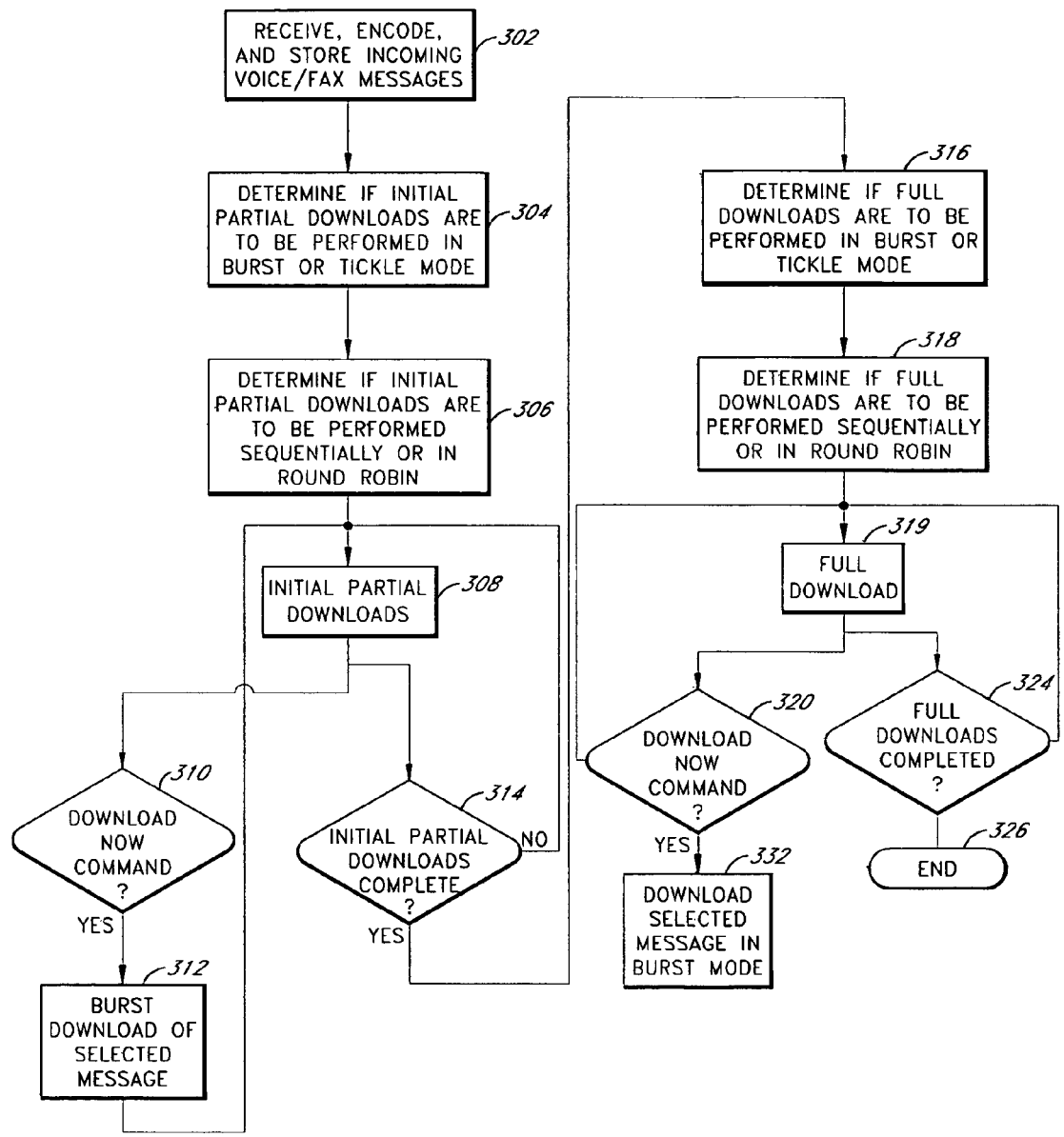
FIG. 3 illustrates an example communication download process.

FIG. 3 illustrates an example message receipt and download process. At state 302, one or more messages (e.g., fax or voice messages) are received by a call management system, encoded (e.g., analog signals may be digitized, voice messages can be encoded in WAV or using other encoders, faxes can be encoded in PDF or TIFF format, etc.), and stored in computer readable memory. At state 304, a determination is made (e.g., via a flag setting or otherwise) as to whether the download process is configured to perform partial downloads of the messages (e.g., a portion of each message, caller information, a message type indicator, or other information discussed below with respect to FIG. 4) using a burst process or a trickle process. Of course the process can be hard coded to perform a burst download or a trickle download without having to make a download-type determination decision after receiving a message.

At state 306, (e.g., via a flag setting or otherwise) as to whether the file download process is configured to be performed sequentially or in round robin mode. At state 308, a partial download process is initiated, wherein initial portions of messages are downloaded to the client terminal with associated related message information (e.g., message identifiers, caller identifiers, message length, etc.) using the configured download modes (e.g., burst or trickle, sequential or round robin). During the partial download state 308, user commands are monitored at state 310 to determine if the user has selected a message for immediate download. If the user has selected a message for immediate download, then at state 312 that message is downloaded in burst mode, and the download of the other messages is temporarily suspended. Once the burst download of the selected message has been completed, the process returns to state 308, and the partial downloads will resume. If, at state 314, a determination is made that the partial downloads are complete, the process proceeds to state 316, where the full download process begins.

At state 316, a determination is made (e.g., via a flag setting or otherwise) as to whether the download process is configured to perform full downloads of the messages using a burst process or a trickle process. Of course the process can be hard coded to perform a burst download or a trickle download without having to make a download-type determination decision after receiving a message.

At state 318, (e.g., via a flag setting or otherwise) as to whether the burst file download process is configured to be performed sequentially or in round robin mode. At state 319, the full download process is initiated, using the configured download modes (e.g., burst or trickle, sequential or round robin). While the full download process is proceeding, user commands are monitored at state 320 to determine if the user has selected a message for immediate download. If the user has selected a message for immediate download, then at state 322 that message is downloaded in burst mode, and the download of the other messages is temporarily suspended. Once the burst download of the selected message has been completed, the full downloads of other messages will resume. If, at state 324, a determination is made that the full download of the messages is complete, the process proceeds to state 326, and the process ends.

FIG. 4 illustrates an example client application that can be displayed on a user terminal. The client application can be provided over a network by the call processing system 124 and stored in user terminal memory. Commands provided by the user via the user interface will be received and executed by the call processing system over a data network (e.g., Internet) linking the client application and call processing system 124. The example user interface includes a table or organizational structure providing one or more of the following message information and controls: message number (optionally, the message number is a link that, when activated will cause any non-downloaded portion of a message to be burst downloaded by the call processing system); a message type (e.g., voice message or fax); a sender identifier (e.g., a name, nickname, caller phone number, code, or an indication that caller information is unavailable, such as might occur if the caller is using caller ID blocking); the time of the call; the total message length (e.g., by pages, time, bytes, etc.); and an indication as to whether a partial or complete message download has been performed; a link which when activated causes partially downloaded messages to be completely download, such as in burst mode, and an indication as to whether the message has already been downloaded; and a view link, which when activated, will cause the voice message to be played via the user terminal or the fax to be displayed on the user terminal using an appropriate viewer (e.g., Adobe acrobat if the file is encoded as a PDF file, or a photograph viewer application if encoded as a TIF or JPEG file).

Figure 5:
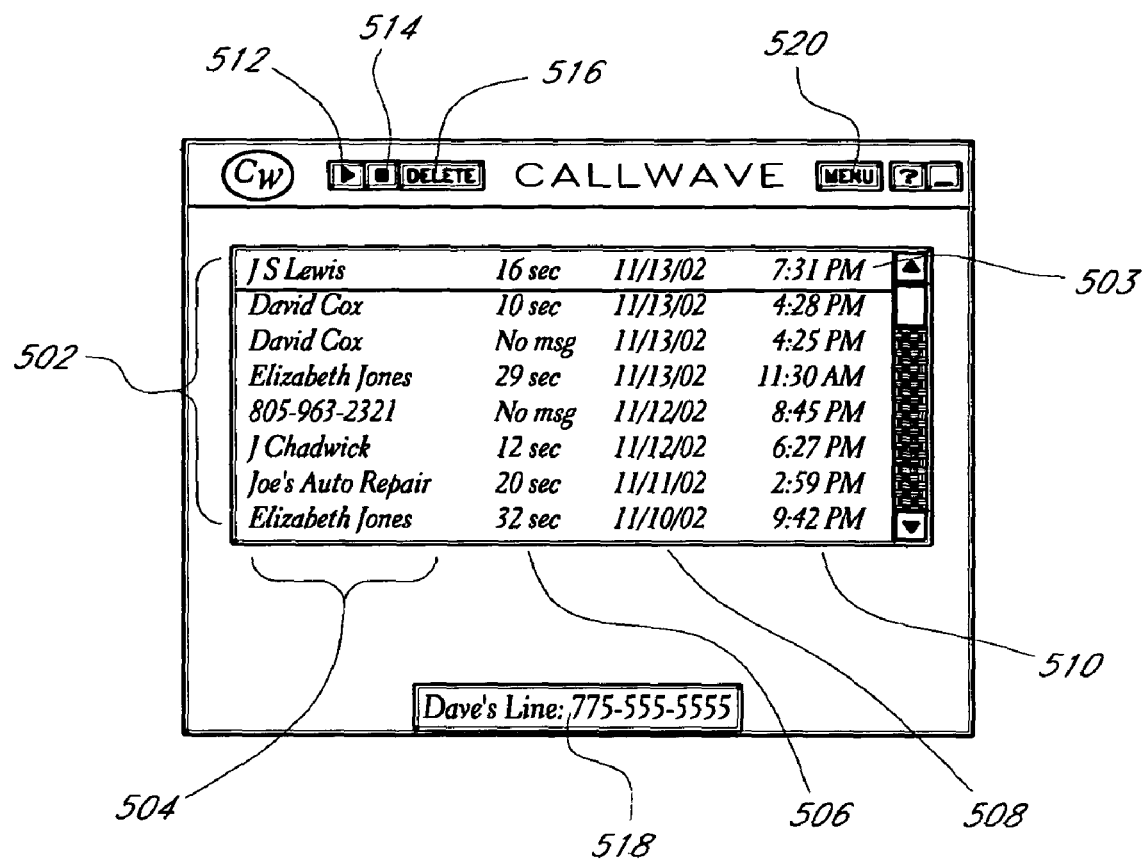
FIG. 5 illustrates another example user form used to access communications.

FIG. 5 illustrates another example client application that can be displayed on a user terminal. As similarly described above with respect to FIG. 4, the client application can be provided over a network by the call processing system 124 and stored in user terminal memory. Commands provided by the user via the user interface will be received and executed by the call processing system over a data network (e.g., Internet) linking the client application and call processing system 124. The example user interface includes a table or organizational structure 502 providing one or more of the following message types of message information: a sender identifier 504 (e.g., a name, nickname, caller phone number, code, or an indication that caller information is unavailable, such as might occur if the caller is using caller ID blocking); the date and time of the call 508, 510; the total message length (e.g., by pages, time, bytes, etc.) which can also provide an indication as to whether the call is a fax call (e.g., the number of pages is displayed), or a voice call (the message length in time is displayed).

With reference to FIG. 5, a play button 512 is provided, wherein, if a message is selected by selecting the corresponding message entry line, such as line 503 in this example, and the play button 512 is activated, the call processing system 124 will burst download the non-downloaded portion (if any) of the selected message entry, and will cause the voice message to be played via the user terminal using an appropriate media player or the fax to be displayed on the user terminal using an appropriate viewer (e.g., Adobe acrobat if the file is encoded as a PDF file, or a photograph viewer application if encoded as a TIF or JPEG file). A pause button 514 is used to pause or stop the playback of a voice message. A delete button 516 is provided, which, when activated by the user, will cause the deletion of the selected message or messages by the client application, and if a selected message has not been fully downloaded, stop the further download of the message. A menu button provides the user with access to still additional functions, such as menu such as undelete of a deleted message, save selected message to a desired location (e.g., to the computer's virtual "desktop"), access to a user account review interface, access to information on how to record a greeting, access information on other service configuration settings, etc. A published number field 518 provides the name or other identifier associated with the user, and a phone number associated with the user, such as a virtual number, wherein calls dialed to the number are answered by the call processing system.

Thus, as described herein, embodiments of the present invention provide for the flexible and efficient downloading or transferring of messages files, such as fax files or voice files, from one computer system to another computer system, over a network.

It should be understood that certain variations and modifications of this invention would suggest themselves to one of ordinary skill in the art. The scope of the present invention is not to be limited by the illustrations or the foregoing descriptions thereof.

What is claimed is:

1. A method of storing and downloading voice and fax communications, the method comprising:
    receiving and storing a fax message intended for a user at a call processing system;
    receiving and storing a voice message intended for the user at the call processing system;
    downloading an initial portion of the fax message to a user terminal and enabling the user to view initial portion of the fax message using the user terminal;
    downloading an initial portion of the voice message to the user terminal and enabling the user to playback the initial portion of the voice message using the user terminal;
    automatically beginning downloading at least a second portion of the fax message to the user terminal in a trickle mode; and
    automatically beginning downloading at least a second portion of the voice message to the user terminal in a trickle mode
    determining that the user has selected the voice message during the trickle mode download of the second portion of the fax message;

automatically pausing the trickle mode download of the second portion of the fax message at least partly in response to determining that the user has selected the voice message;

completing downloading at least the second portion of the voice message in a burst mode while the trickle mode download of the second portion of the fax message is paused; and automatically resuming the trickle mode download of the second portion of the fax message after the second portion of the voice message has been downloaded in burst mode.

2. The method as defined in claim 1, wherein the initial portion of the fax message is downloaded to the user terminal in a burst mode.

3. The method as defined in claim 1, wherein the initial portion of the fax message is downloaded to the user terminal in a trickle mode.

4. The method as defined in claim 1, wherein the second portion of the fax message and the second portion of the second portion of the voice message are downloaded using a round robin process.

5. The method as defined in claim 1, wherein the fax message is received at the call processing system prior to the voice message, and the initial portion of the fax message is downloaded to the user terminal before the initial portion of the voice message.

6. The method as defined in claim 1, wherein the fax message is received at the call processing system prior to the voice message, and the initial portion of the fax message is downloaded to the user terminal after the initial portion of the voice message.

7. The method as defined in claim 1, wherein the user terminal displays links to the downloaded initial portions of the fax message and the voice message.

8. The method as defined in claim 1, further comprising:
receiving caller identification information associated with the caller providing the voice message and with the fax message originator at the call processing system; and
transmitting to the user terminal caller identification information associated with the caller providing the voice message and with the fax message originator at the call.

9. The method as defined in claim 1, further comprising causing a user interface to be displayed via the user terminal, the user interface including:
an entry corresponding to the fax message;
a message type identifier associated with the fax message entry that identifies the fax message entry as a fax message;
a message length associated with the fax message entry that indicates the number of pages in the fax message;
an indication as to when the fax message was received;
an entry corresponding to the voice message;
a message type identifier associated with the voice message entry that identifies the voice message entry as a voice message; and
an indication as to when the voice message was received.

10. A method of storing and downloading messages to user terminals, the method comprising:
receiving and storing a first plurality of messages, including fax and/or voice messages intended for a first user, at a first telecommunication system;
automatically initiating the download of initial portions of the first plurality of messages to the user terminal;
during the download of initial portions of the first plurality of messages to the user terminal, determining if the user has selected one of the first plurality of messages before the selected message has been downloaded in its entirety;

automatically pausing the download of the non-selected first plurality of messages at least partly in response to determining that the user has selected one of the first plurality of messages;

downloading the selected one of the first plurality of messages in a burst mode while the download of the non-selected first plurality of messages is paused;

after the selected one of the first plurality of messages has been downloaded in burst mode, automatically resuming the download of the initial portions of the non-selected first plurality of messages; and downloading additional portions of the non-selected first plurality of messages after the initial portions of the non-selected first plurality of messages have been downloaded in their entirety.

11. The method as defined in claim 10, wherein the user terminal is configured to present the downloaded initial portions to the user after receiving a corresponding user instruction.

12. The method as defined in claim 10, wherein the user terminal is a personal computer or an interactive television.

13. The method as defined in claim 10, wherein the user terminal accesses the call processing system via a dial-up modem.

14. The method as defined in claim 10, wherein the first plurality of messages includes a least one fax document and one voice recording.

15. The method as defined in claim 10, wherein the initial portions of the first plurality of messages are downloaded to the user terminal in background mode.

16. The method as defined in claim 10, further comprising downloading at least second portions of the non-selected first plurality of messages using a round robin process.

17. The method as defined in claim 10, further comprising downloading at least second portions of the non-selected first plurality of messages using a first-in-first-out process.

18. The method as defined in claim 10, further comprising downloading at least second portions of the non-selected first plurality of messages using a last-in-first-out process.

19. The method as defined in claim 10, further comprising:
receiving caller identification information associated with a caller providing a one of the first plurality of messages; and
transmitting to the user terminal caller identification information associated with the caller.

20. The method as defined in claim 10, further comprising causing a user interface to be displayed via the user terminal, the user interface including:
an entry corresponding to a fax message;
a message type identifier associated with the fax message entry that identifies the fax message entry as a fax message;
a message length associated with the fax message entry that indicates the number of pages in the fax message;
an indication as to when the fax message was received;
an entry corresponding to a voice message;
a message type identifier associated with the voice message entry that identifies the voice message entry as a voice message; and
an indication as to when the voice message was received.

21. The method as defined in claim 10, wherein the first plurality of messages includes image data.

* * * * *

UNITED STATES PATENT AND TRADEMARK OFFICE
CERTIFICATE OF CORRECTION

| | | |
|---|---|---|
| PATENT NO. | : 7,965,825 B1 | Page 1 of 1 |
| APPLICATION NO. | : 11/497403 | |
| DATED | : June 21, 2011 | |
| INVENTOR(S) | : Scott Herriman et al. | |

It is certified that error appears in the above-identified patent and that said Letters Patent is hereby corrected as shown below:

Title page (Item 74), Attorney, line 1, Change "Maretns," to --Martens,--.

Column 3, line 38, Change "an be" to --can be--.

Column 4, line 2, Change "Von)" to --VoIP--.

Column 4, line 53, Change "describer" to --described--.

Column 16, line 29, In Claim 14, change "a" to --at--.

Signed and Sealed this

Sixth Day of December, 2011

David J. Kappos
*Director of the United States Patent and Trademark Office*